(12) United States Patent
Greenwood et al.

(10) Patent No.: US 8,972,105 B2
(45) Date of Patent: Mar. 3, 2015

(54) TIRE PRESSURE MONITORING

(75) Inventors: Jeremy Greenwood, West Midlands (GB); Chris Clarke, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 13/578,465

(22) PCT Filed: Feb. 10, 2011

(86) PCT No.: PCT/EP2011/051983
§ 371 (c)(1),
(2), (4) Date: Oct. 29, 2012

(87) PCT Pub. No.: WO2011/098532
PCT Pub. Date: Aug. 18, 2011

(65) Prior Publication Data
US 2013/0138293 A1    May 30, 2013

(30) Foreign Application Priority Data
Feb. 10, 2010  (GB) .................................. 1002120.2

(51) Int. Cl.
*G06F 7/00* (2006.01)
*B60C 23/00* (2006.01)
*B60C 23/04* (2006.01)

(52) U.S. Cl.
CPC .............. *B60C 23/00* (2013.01); *B60C 23/009* (2013.01); *B60C 23/0408* (2013.01); *B60C 23/0415* (2013.01); *B60C 23/0471* (2013.01)
USPC ....................................................... 701/36

(58) Field of Classification Search
USPC .......................................................... 701/36
See application file for complete search history.

(56) References Cited

U.S. PATENT DOCUMENTS

| 6,885,296 B2* | 4/2005 | Hardman et al. ............. 340/505 |
| 6,900,725 B1 | 5/2005 | Berry et al. |
| 7,570,157 B2* | 8/2009 | Miller et al. .................. 340/445 |
| 7,705,717 B2* | 4/2010 | Pearce et al. .................. 340/447 |
| 2009/0096599 A1* | 4/2009 | Kranz ........................... 340/459 |

(Continued)

FOREIGN PATENT DOCUMENTS

| AU | 2011214367 A1 | 9/2012 |
| CA | 2789294 A1 | 8/2011 |

(Continued)

OTHER PUBLICATIONS

International Search Report for PCT/EP2011/051983 dated Apr. 8, 2011, 3 pages.

(Continued)

*Primary Examiner* — Mary Cheung
*Assistant Examiner* — Anne Mazzara
(74) *Attorney, Agent, or Firm* — Reising Ethington P.C.

(57) ABSTRACT

A method, program and system to establish tire monitoring of an auxiliary vehicle (2) from a main vehicle (1) is described. The main vehicle (1) detects tire monitor identities of tire monitors (6) of the auxiliary vehicle (2) by the main vehicle. The main vehicle (1) determines whether the auxiliary vehicle tire monitor identities are associated with an identified auxiliary vehicle. If the auxiliary vehicle tire monitor identities are associated with an identified auxiliary vehicle, tire monitoring for the auxiliary vehicle (2) is established on the basis of monitoring values stored for the identified auxiliary vehicle.

14 Claims, 8 Drawing Sheets

(56) References Cited

U.S. PATENT DOCUMENTS

| | | |
|---|---|---|
| 2010/0156667 A1 | 6/2010 | Bennie et al. |
| 2010/0283594 A1 | 11/2010 | Li |

FOREIGN PATENT DOCUMENTS

| | | | |
|---|---|---|---|
| EP | 1769948 | A2 | 4/2007 |
| EP | 1946945 | | 7/2008 |
| EP | 2533990 | A1 | 12/2012 |
| GB | 2415048 | A | 12/2005 |
| GB | 2500780 | A | 10/2013 |

OTHER PUBLICATIONS

Written Opinion for PCT/EP2011/051983 dated Apr. 8, 2011, 7 pages.

Great Britain Search Report for application No. GB1002120.2, dated Jun. 29, 2011, 1 page.

\* cited by examiner

TIRE PRESSURE MONITORING

TECHNICAL FIELD

The present invention relates to monitoring of vehicle tyres, in particular monitoring of tyre pressures. In aspects, the invention has particular relevance to the monitoring of tyre pressures in auxiliary vehicles, such as trailers or caravans.

BACKGROUND TO THE INVENTION

Tyre pressure monitoring systems are in current commercial use in many types of vehicle. These typically involve a tyre valve which contains a sensor adapted to measure tyre pressure and a communication means which allows the sensor value to be received by an appropriate control system within the vehicle. Tyre pressure information is then provided to the driver as and when required—this may be by display on an appropriate user interface, or by warning alerts or system interventions if the tyre pressure reaches an appropriate threshold.

U.S. Pat. No. 6,900,725 describes a tyre pressure monitoring system which may be extended for use with auxiliary tyres beyond those in active use in a main vehicle. Such auxiliary tyres may include a spare tyre for a main vehicle, but also tyres for an auxiliary vehicle such as a trailer. The system described has a learn mode in which auxiliary tyre sensors can be detected and in which the driver (or other user) can provide tyre pressure threshold values.

In practice, it is difficult to use conventional tyre pressure monitoring systems for auxiliary vehicles such as trailers. This is because many alternative forms of auxiliary vehicle could be used, with the result that correct data entry by the driver is relied on to ensure effective pressure monitoring. There are many disadvantages to this. The driver may not have the relevant information readily available, and the need to enter data in this way may affect the driver's ease of use of the relevant vehicle. Moreover, driver error in data entry may lead to significant safety risks. It is desirable to improve tyre monitoring so as to reduce at least some of these disadvantages.

SUMMARY OF THE INVENTION

In a first aspect, the invention provides a method to establish tyre monitoring of an auxiliary vehicle from a main vehicle, the method comprising: detection by the main vehicle of tyre monitor identities of tyre monitors of the auxiliary vehicle by the main vehicle; determination by the main vehicle of whether the auxiliary vehicle tyre monitor identities are associated with an identified auxiliary vehicle; and if the auxiliary vehicle tyre monitor identities are associated with an identified auxiliary vehicle, establishing tyre monitoring for the auxiliary vehicle on the basis of monitoring values stored for the identified auxiliary vehicle.

This allows for tyre monitoring to be established for an auxiliary vehicle in the vast majority of required cases with little or no driver intervention required. This method provides for safe and effective monitoring with great ease of use for a driver.

In a second aspect, the invention provides a method to establish tyre monitoring of an auxiliary vehicle from a main vehicle, the method comprising: detection by the main vehicle of tyre monitor identities of tyre monitors of the auxiliary vehicle by the main vehicle; determination by the main vehicle of whether the detected tyre monitors are associated with an identified auxiliary vehicle; and if the detected tyre monitors are not associated with an identified auxiliary vehicle, setting monitoring values for tyre monitoring corresponding to measured values of one or more of the auxiliary vehicle tyre monitors.

This approach allows for tyre monitoring to be established for new auxiliary vehicles reliably, while enabling driver input to be required if needed but not otherwise. Again, this allows for safe tyre monitoring in auxiliary vehicles with great ease of use.

Preferably, monitoring values are set corresponding to the value measured at a chosen one of the auxiliary vehicle tyre monitors. Advantageously, the main vehicle determines from the measured value or values of the auxiliary vehicle tyre monitors one or more thresholds or ranges to trigger warnings for tyre monitor measurements.

In a third aspect, the invention provides a method to establish tyre monitoring of an auxiliary vehicle from a main vehicle, the method comprising: detection by the main vehicle of tyre monitor identities of tyre monitors of the auxiliary vehicle by the main vehicle; determination by the determination by the main vehicle of whether the detected tyre monitors are in a set of tyre monitors associated with an identified auxiliary vehicle, wherein determination by the main vehicle of whether the detected tyre monitors are in a set of tyre monitors associated with an identified auxiliary vehicle does not require detection of all the tyre monitor identities associated with an identified auxiliary vehicle.

This approach allows for tyre monitoring to continue despite changes of tyre or wheel in the auxiliary vehicle in a manner which is safe but such that the driver need only provide input when this is necessary or desirable.

Advantageously, an identified auxiliary vehicle is identified when not all the tyre monitor identities associated with an identified auxiliary vehicle are detected, and further comprising determination of whether a detected tyre monitor identity associated with neither the main vehicle nor the auxiliary vehicle should replace the non-detected tyre monitor identity in an association with the identified auxiliary vehicle. Preferably, said determination is made if the detected tyre monitor identity is detected for longer than a predetermined time or for more than a predetermined number of times.

In aspects, the invention further provides a computer program stored in a memory, such that when a processor of a main vehicle is programmed by the computer program, the processor is adapted to perform any of the methods set out above.

In aspects, the invention further provides a monitoring system to enable tyre monitoring of an auxiliary vehicle from a main vehicle, the monitoring system comprising: a controller having a processor and a memory; transceiver means to obtain information from tyre monitors of the auxiliary vehicle; and a human-machine interface to provide tyre monitoring values to a user and to receive user input; wherein the memory contains a computer program as set out above, and wherein the processor is programmed to control the monitoring system to perform any of the methods as set out above.

BRIEF DESCRIPTION OF DRAWINGS

Specific embodiments of the invention will now be described below, by way of example, with reference to the accompanying drawings, of which.

DETAILED DESCRIPTION OF SPECIFIC EMBODIMENTS

Figure 1:
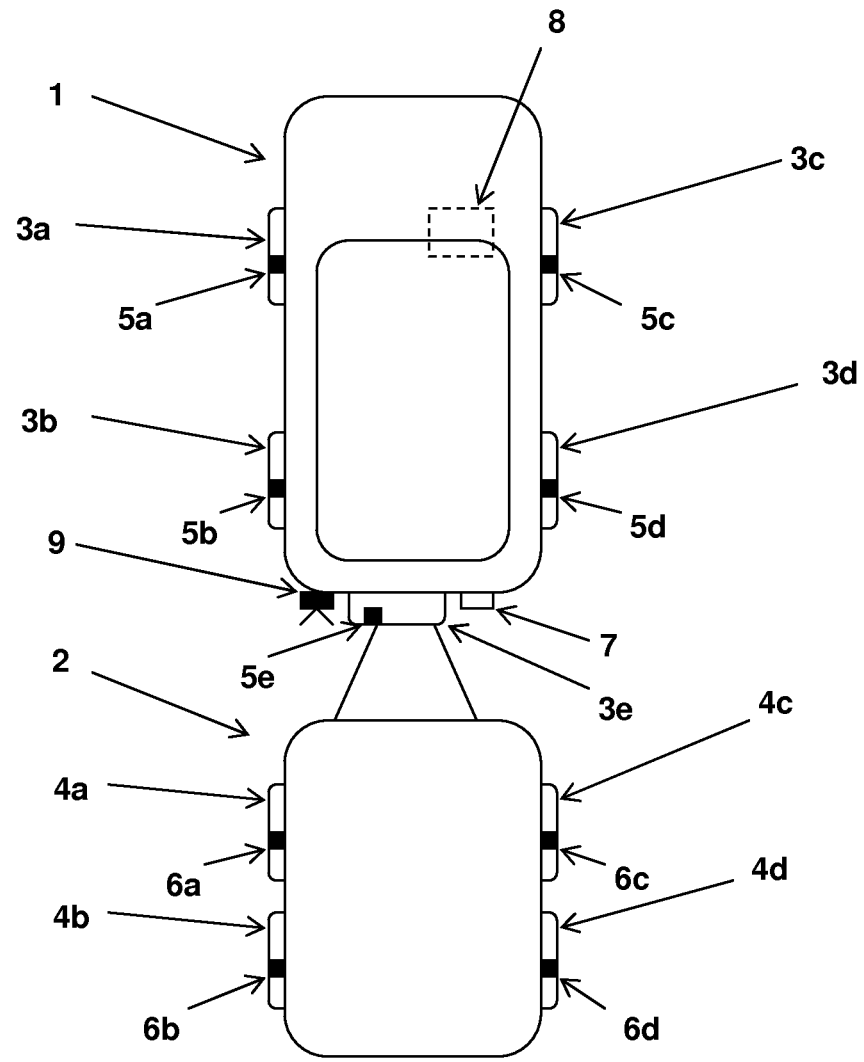
FIG. 1 is a schematic view of a vehicle and an auxiliary vehicle configured for automatic tyre monitoring in accordance with aspects of the invention.

FIG. 1 shows a schematic view of a vehicle and an auxiliary vehicle configured for automatic tyre monitoring in accordance with aspects of the invention.

In this case, vehicle 1 (which may be a car, a tractor or a truck, for example) is towing auxiliary vehicle 2 (which may be a trailer or a caravan, for example). In the normal case for use of aspects of the invention, the vehicle 1 will be towing the auxiliary vehicle 2, though application of the invention is not limited to this context. Both vehicles shown are four-wheeled vehicles, with vehicle 1 having four tyres 3a-3d on the rolling wheels and one spare tyre 3e and with auxiliary vehicle 2 having four tyres 4a-4d, one on each rolling wheel. This is purely an example for the purposes of illustration—either vehicle 1 or auxiliary vehicle 2 or both may have a different number of wheels. Each tyre has a tyre monitor: vehicle tyre monitors 5a-5e are fitted on the vehicle tyres and auxiliary vehicle tyre monitors 6a-6d are fitted on the auxiliary vehicle tyres. All the tyre monitors are preferably of the same type, though this need not be the case in all embodiments of the invention.

The tyre monitors 5a-5e 6a-6d are in communication with a controller 8 in the vehicle 1. In the arrangement shown, this is by wireless communication for the auxiliary vehicle tyre monitors 6a-6d at least. The communication mechanism between the vehicle tyre monitors 5a-5e and the controller 8 is not shown explicitly, but may be by any communication type used in conventional vehicle tyre monitoring systems. A suitable wireless communication method may be used, and use of radio frequency communication is particularly suitable.

In the arrangement shown in FIG. 1, radio frequency communication is used for communication between the controller 8 and the auxiliary vehicle tyre monitors 6a-6d. The controller 8 is in communication (this may be wired or wireless) with a transceiver 7 which is mounted at the rear of the vehicle 1 for effective radio communication with transceivers in the auxiliary vehicle tyre monitors 6a-6d. Here, transceiver 7 for communication with the auxiliary vehicle tyre monitors 6a-6d should be mounted for effective RF communication with them. A particularly suitable mounting position for the transceiver 7 in vehicles with a rear power take-off (PTO) is in the PTO hole through which access to the PTO may be obtained—for example, the transceiver may be mounted within a cover to the PTO hole. This arrangement also allows the transceiver 7 to be protected effectively in use. A camera 9 is also shown as mounted on the rear of vehicle 1—this is used for reversing assistance, as is discussed with reference to FIGS. 4A and 4B.

The controller 8 may be a discrete computational subsystem within the vehicle 1, or may be a subsystem within a main computational system of the vehicle 1. The controller 8 comprises a programmed processor with access to a memory. Functional elements of the controller 8 are further illustrated in FIG. 2, which indicates functional elements of a control system suitable for use in aspects of the invention.

Figure 2:
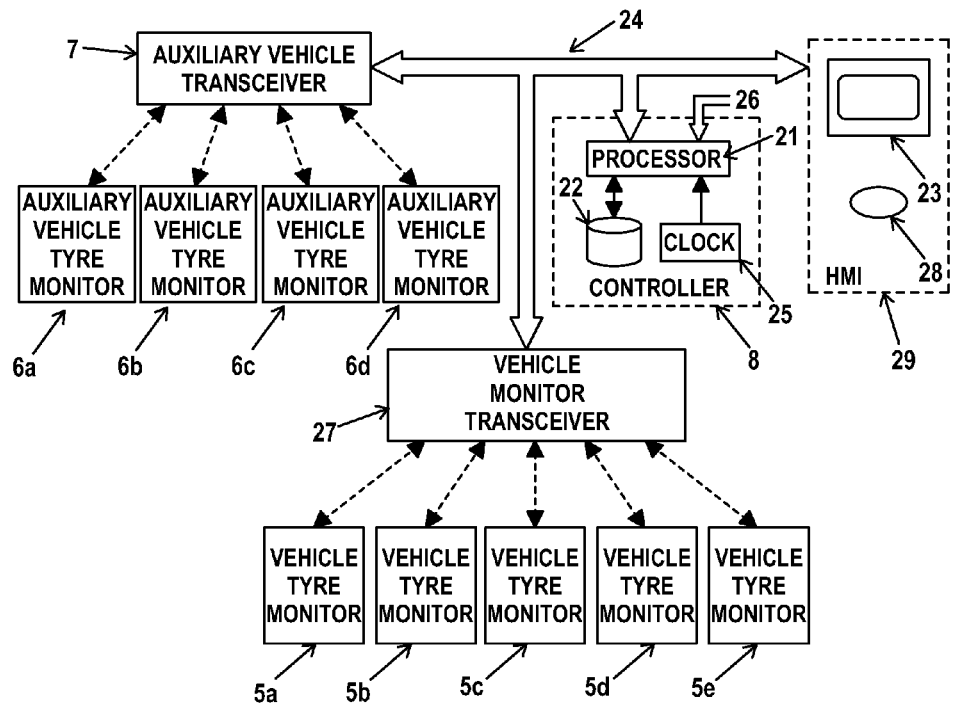
FIG. 2 indicates functional elements of a control system suitable for use in aspects of the invention.

FIG. 2 shows functional elements of a control system suitable for use in aspects of the invention. The controller 8 comprises (at least) a processor 21 adapted to run a tyre monitoring process program stored in memory 22 (memory 22 may in practice be realised by a combination of memories of different types to provide program and data storage and working memory for processor 21) and a clock 25 to provide timing information for processes described below—it will also require a power source (not shown). The processor 21 receives inputs and provides outputs through a vehicle bus 24 for communication with other vehicle components. The processor 21 may be a main processor for the vehicle 1, or may be a dedicated processor adapted to run this specific process or a group of specific processes.

In the arrangement shown in FIG. 2, there are two transceivers connected to the vehicle bus 24—auxiliary monitor transceiver 7 for communication with the auxiliary vehicle tyre monitors 6 and vehicle monitor transceiver 27 for communication with the vehicle tyre monitors 5. Communication between the monitors and the transceivers may use conventional RF communication technologies and protocols. In other arrangements, a single transceiver may be used to communicate with both the vehicle tyre monitors 5 and the auxiliary tyre monitors 6. Data provided by the tyre monitors 5,6 then passes through the vehicle bus 24 to the processor 21, where it is used by the processor 21 performing a tyre monitoring process. Other inputs 26 may also be used by the processor 21 in performing the tyre monitoring process—these other inputs 26 may include, for example, inputs from a barometric pressure sensor information, an ambient temperature sensor, a speed sensor, a distance measurement device, a braking sensor and an ignition sensor. Such inputs may be used if required to refine the basic tyre monitoring process as described here.

The processor 21 also communicates over the vehicle bus 24 with a human-machine interface 29. This human-machine interface 29 comprises at least a display 23 and a user input means 28 (which may include, for example, buttons, switches or touchscreens). The human-machine interface 29 may include other components—for example, it may also include a loudspeaker to provide audible warnings when a danger threshold has been passed. Human-machine interfaces 29 for use in aspects of the invention will be described further below with reference to FIGS. 4A and 4B.

Figure 3:
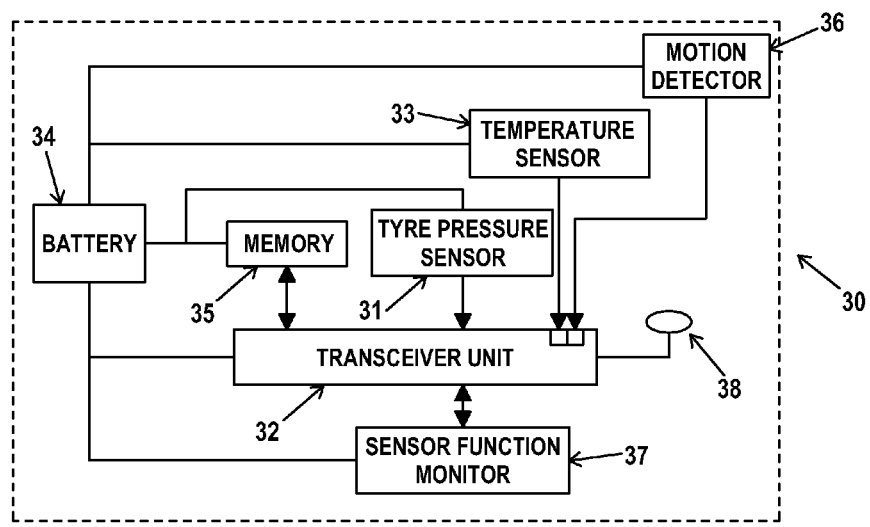
FIG. 3 indicates functional elements of a tyre monitor suitable for use in aspects of the invention.

FIG. 3 indicates functional elements of a tyre monitor for use in aspects of the invention. Tyre monitor 30 may be used for any of vehicle tyre monitors 5 or auxiliary vehicle tyre monitors 6 as shown in FIG. 1. Transceiver unit 32, which contains processing logic programmed to enable it to perform monitoring operations and communicate with the processor 21, is provided with antenna 38 for radio frequency communication and is connected with a memory 35 which holds programming instructions and an identity for the tyre monitor 30. The transceiver unit 32 is also in electrical communication with the other functional elements of the tyre monitor 30.

These functional elements include a tyre pressure sensor 31 and, in aspects of the invention, a temperature sensor 33. In embodiments, the tyre monitor 30 is also provided with a motion detector 36 (so that it can be determined whether or not the tyre monitor 30 is located on a rolling wheel) and a sensor function monitor 37 to determine whether the different functional elements of the tyre monitor 30 are functioning as intended. All functional elements of the tyre monitor 30 are powered by a battery 34.

The tyre monitor may be programmed in any way that allows readings to be provided to the controller 8 effectively during operation of the relevant vehicle. Monitoring actions may take place at all times, or only when the tyre monitor 30 is activated by receiving a wake-up signal from the controller 8. When the tyre monitor is active, sensor values may be measured continuously or intermittently, depending on whatever approach is convenient and appropriate for the sensor type concerned. According to the communications protocol used, the tyre monitor 30 may provide a signal providing monitor values in response to a request signal from the controller 8, or may transmit values in a regular timing pattern in response to an indication that controller 8 is listening for monitoring signals. The signal provided by the tyre monitor 30 includes its identity value, together with values for each required monitoring value. It may be that only some of these values—the tyre pressure and in some aspects also the temperature—are provided in these regular monitoring signals. Other values may, if preferred, only be provided in response to specific instructions from the controller 8.

Figure 4A:
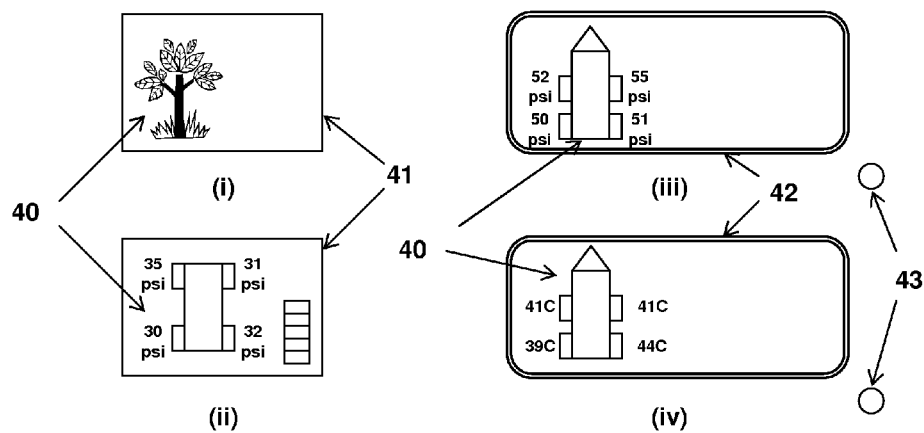
FIGS. 4A and 4B illustrate human-machine interfaces suitable for use in aspects of the invention.
Figure 4B:
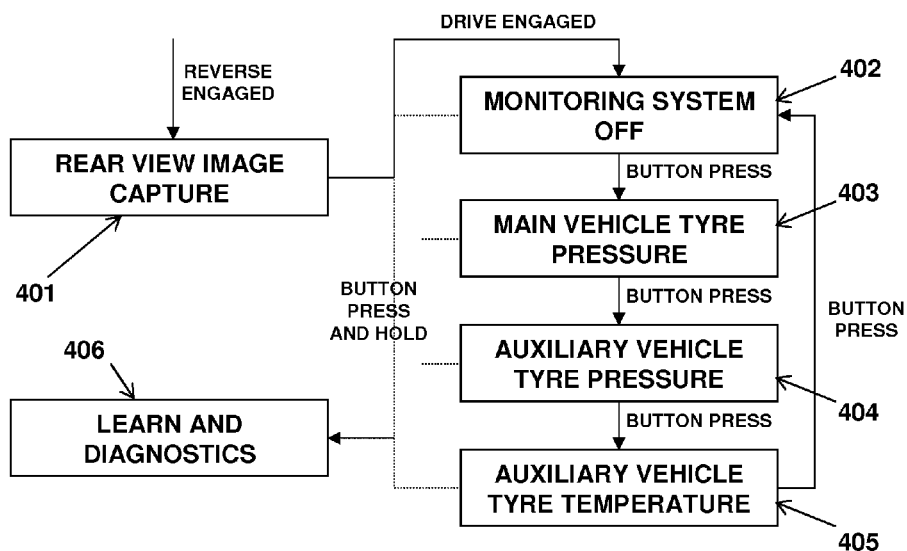

Exemplary human-machine interfaces suitable for use for aspects of the invention are shown in FIGS. 4A and 4B. FIG. 4A shows a display illustrating four separate display states in (i), (ii), (iii) and (iv) respectively. FIG. 4A illustrates two alternative display types (vehicle 1 may in practice have either type). The display 40 may be provided as part of a touch screen display 41 which may be mounted on a car dashboard (shown in FIGS. 4A(i) and 4A(ii)), or may be provided as part of a video mirror 42 used as a rear view mirror (shown in FIG. 4A(iii) and 4A(iv). User input may be provided through the touch screen 41, or by a separate button input 43 mounted on the dashboard or on an indicator stalk, for example.

The four display states shown relate to four possible display states of the system, as will be further discussed with reference to the state diagram shown in FIG. 4B. The arrangements shown in FIG. 4A and FIG. 4B include a rear view camera 9 mounted on the rear of the vehicle (as shown in FIG. 1). This can be used to ensure that the attachment of the auxiliary vehicle 2 to the vehicle 1 does not cause additional problems in reversing of the vehicle. As shown in FIG. 4B in state 401, when reverse is engaged on the vehicle 1 the display 40 shows the view captured by the rear view camera 9, to ensure that operations with the auxiliary vehicle 2 are carried out effectively—this is the view shown in FIG. 4A(i).

When drive is engaged, the display 40 no longer shows the rear view camera image but advances to a system off state 402 (alternatively, on first entering drive the system may be required to cycle through the following states to ensure that all initial tyre monitoring results are displayed to the user). On one button press, the system advances to the next state 403, which is an indication of the vehicle tyre pressures as shown in FIG. 4A(ii). This is essentially as may be provided by a conventional vehicle tyre pressure management system.

On a further button press, the system advances to an auxiliary vehicle tyre pressure monitoring state 404, as shown in FIG. 4A(iii). This may have elements distinct from the vehicle tyre pressure monitoring state 403 displayed in FIG. 4A(ii). First of all, there may be a variety of possible auxiliary vehicles represented—the representation will preferably not only indicate the wheel configuration of the auxiliary vehicle, but will provide some indication of the specific auxiliary vehicle measured. Mechanisms for identification of auxiliary vehicles will be discussed later in this specification, but may involve association of tyre monitor identities with particular auxiliary vehicles. The display of this state will preferably indicate to the user which auxiliary vehicle is identified by the controller 8 as being monitored.

On a still further button press, the system advances to an auxiliary vehicle tyre temperature monitoring state 405, as shown in FIG. 4A(iv). This resembles the auxiliary vehicle tyre pressure monitoring state 404, differing only in that monitored temperature, rather than tyre pressure, is displayed. On a further button press, the system completes its cycle and returns to the system off state 402.

On an extended button press (press and hold) from any of the monitoring system states 402, 403, 404, 405, the system switches to a learn and diagnostic state 406. This state—not illustrated here, but it will provide a menu and submenus of data entry and review options—allows the driver to add identities and default values for new auxiliary vehicles and to modify existing data and system parameters. It is desirable for a good driver experience, and also for safety given the risk of data entry errors, for this menu to be used only when strictly required. This is discussed in greater detail below with reference to aspects of the invention.

The human-machine interface will also provide alarms—not shown explicitly in FIGS. 4A and 4B—when monitored values are the wrong side of predetermined safety thresholds or lie outside predetermined safe ranges. In such a case, a further visual alarm (perhaps linked to a main warning system of the vehicle) or an audible alarm may be provided. Triggering of such alarms will also be discussed further below in the context of aspects of the invention.

A process of tyre monitoring suitable for use in the system illustrated above will now be described. Most generally, the process involves the establishment of tyre monitoring according to determined criteria, followed by a process of regular measurement of values by the tyre monitor, polling of each tyre monitor by the controller to determine current tyre values and to calculate whether these values should trigger a response, together with display of tyre values to the driver as requested and the provision of warnings to the user if a safety threshold is passed or if measured or calculated values fall outside a safe range. This process will be considered with reference to FIGS. 5 to 9.

Figure 5:
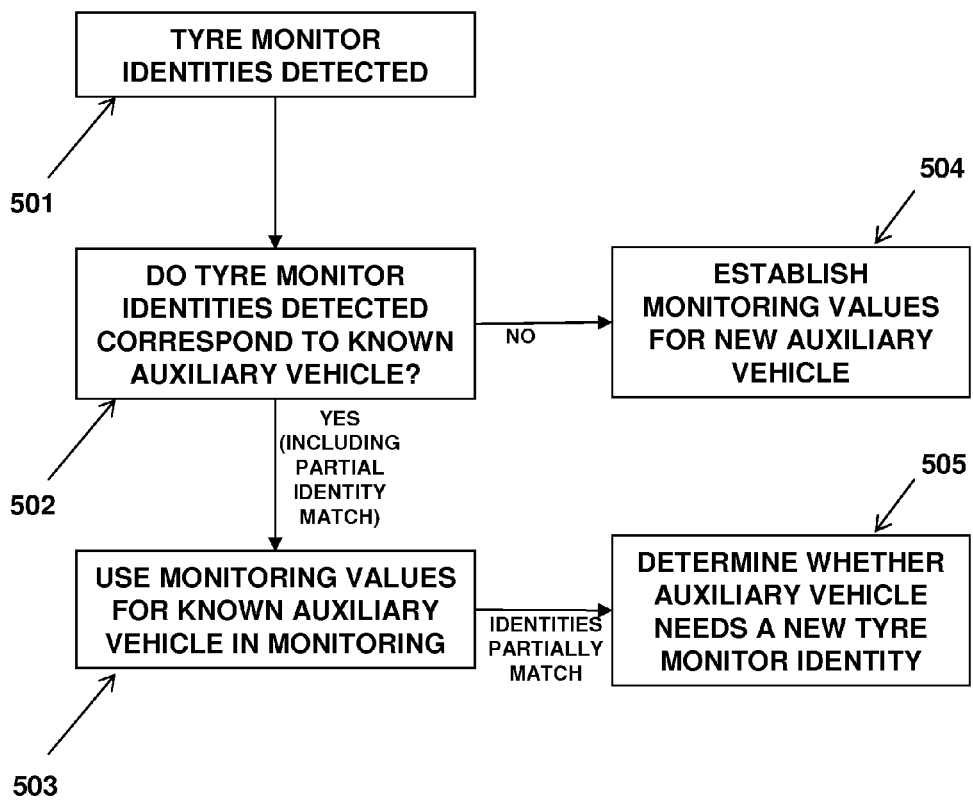
FIG. 5 is a flow diagram illustrating establishment of tyre monitoring according to an aspect of the invention.

FIG. 5 is a flow diagram illustrating establishment of tyre monitoring according to an aspect of the invention. In step 501, the controller establishes contact with all the tyre monitors and—at least for the tyre monitors monitoring the auxiliary vehicle tyres—establishes their identity. This step may not be required for the vehicle tyre monitors, if position information is also determined in this stage—for vehicle tyres, the tyre monitor identity may be of less significance as the requirements for monitoring may be determined by which wheel the tyre concerned is mounted.

For the auxiliary vehicle tyres, in step 502 the controller determines whether the identities of the auxiliary vehicle tyre monitors correspond to those associated with an auxiliary vehicle already known to the controller. This may be an auxiliary vehicle for which the vehicle owner has already provided details, or one for which the details have already been programmed into the controller by the manufacturer or dealer. This determination may be made if all the auxiliary tyre monitor identities correspond to those stored by the controller for a specific auxiliary vehicle, or in some arrangements if only some of the auxiliary tyre monitor identities correspond (this situation is discussed in more detail with reference to FIG. 7 below).

If the determination is made that the auxiliary tyre monitor identities correspond to a known auxiliary vehicle, in step 503 monitoring values stored in the controller for use in monitoring that auxiliary vehicle are used in the subsequent monitoring process. Should there be a reason to deviate from these default monitoring values—for example, the driver is intending to drive the vehicle in extreme driving conditions for which different monitoring values would be appropriate—these default values could be changed by use of the learn and diagnostic state discussed above with reference to FIG. 4. In the normal case, however, this process enables monitoring of auxiliary vehicle tyres to commence without the need for positive driver input. The display will also show an appropriate logo for the auxiliary vehicle—the auxiliary vehicle will show the appropriate number of wheels and in some cases also the wheel position relative to the overall dimensions of the auxiliary vehicle. An auxiliary vehicle identity—and possibly an indication of make or model—may also be displayed. It is desirable for all auxiliary vehicles to be used regularly with the vehicle to have their monitoring values—and hence also safe threshold and range values—established in this way, and the system will have the capacity to store a significant number (say, up to 64) sets of identities and values associated with specific auxiliary vehicles.

While the driver may be requested to calculate or approve safety threshold and safe range values, it will generally be desirable for these to be predetermined by the manufacturer or dealer for identified makes and model of auxiliary vehicle, or else calculated by the controller from the monitoring values. In the case of tyre pressure, for example, a safe range may be determined as being within a predetermined percentage of the value set for the measured tyre pressure to be compared against, with the user given a warning if the tyre pressure is measured to be outside this range. Significant underinflation may represent a more severe safety risk—detection that tyre pressure has fallen below a particular percentage of the value set for measured tyre pressure to be compared against may lead to a more drastic warning to the driver (who will generally also or already have been warned that the tyre pressure is outside the safe range). Using this approach, there will be no need for the driver to determine threshold levels or safe ranges, though it may also be possible if desired for the driver to be able to amend default threshold levels or safe ranges through the learn and diagnostic state.

Detection of an auxiliary vehicle identity from the tyre pressure monitor identities may be used for other systems or processes within the vehicle. The controller may pass this information to other controllers through the vehicle bus, for example. Examples of systems and processes which may benefit from knowledge of an auxiliary vehicle identity (and hence make and model—for a trailer, this may be provided with dimension information and wheel configuration, for example) are systems and processes to mitigate auxiliary vehicle sway and systems and processes to provide reversing guidance when an auxiliary vehicle is present.

Figure 6:
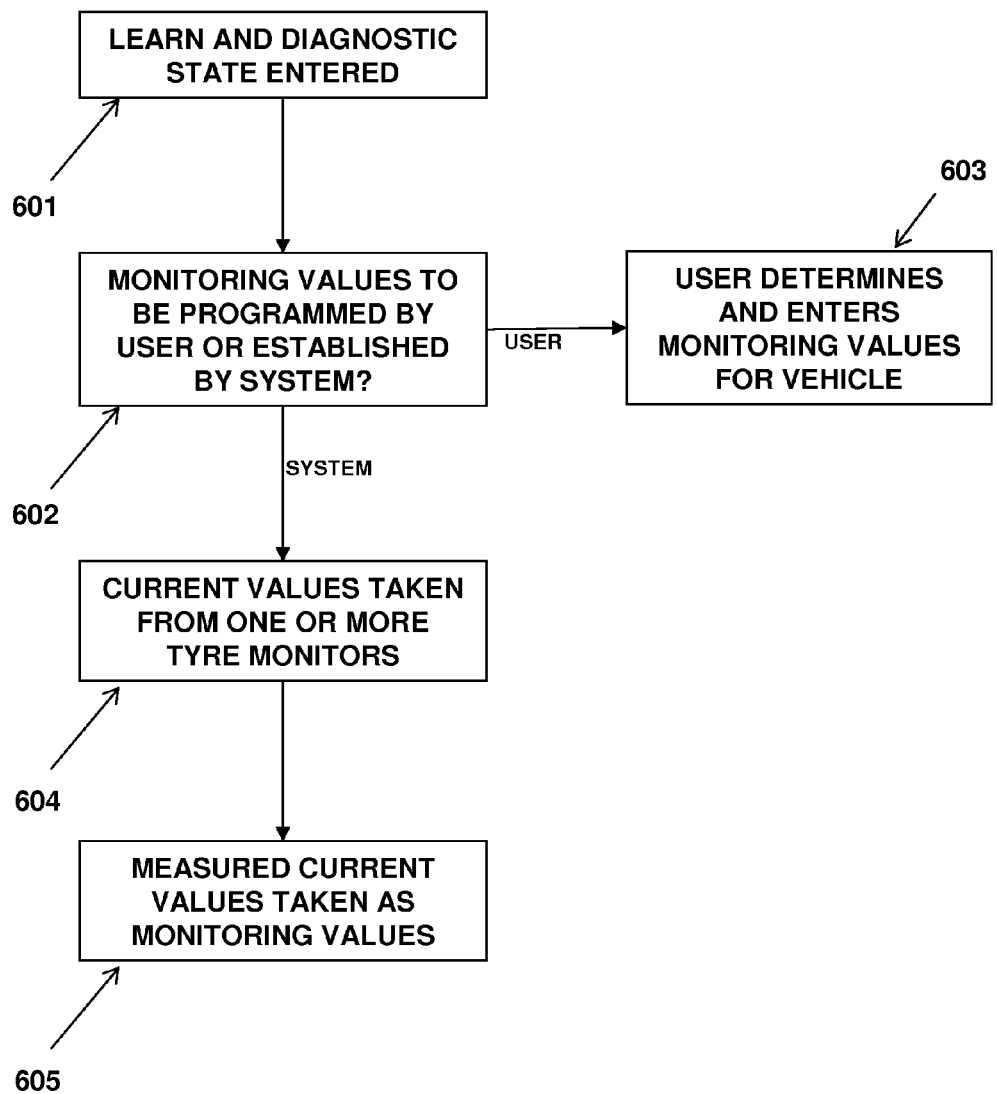
FIG. 6 is a flow diagram illustrating establishment of default values for tyre monitoring according to an aspect of the invention.

If the detected auxiliary vehicle tyre monitors are not associated with a known auxiliary vehicle, the process shown is that indicated in FIG. 6—step 504 of FIG. 5 indicates when this process may be invoked. The processor accesses in step 601 the learn and diagnostic state to establish monitoring values for monitoring of the new auxiliary vehicle tyres. The identity of each auxiliary vehicle tyre monitor is established from detection—positions may also be detected to provide a wheel configuration for the auxiliary vehicle. It is then necessary for the appropriate monitoring values to be established for the new auxiliary vehicle, and this will generally require some level of driver input. It is desirable for this to be minimised, both for driver convenience and to minimise the safety risks associated with driver user input errors. One possibility is for a list of possible auxiliary vehicles (such as makes of trailer or caravan) to be stored together with appropriate default monitoring values in the controller—the driver could then identify the appropriate auxiliary vehicle from the list. A further possibility is for the driver simply to enter appropriate monitoring values for a given auxiliary vehicle from a vehicle manual—while this may be straightforward, if time-consuming, for tyre pressure, other default monitoring values (such as tyre operating temperature) may not be provided in this way. In either case there is potential for driver error.

A default procedure which is lower in risk is shown in FIG. 6. At step 602, the driver determines whether to programme (step 603) auxiliary vehicle values himself (by one of the methods described in the previous paragraph), or to have the system determine default monitoring values. If the system is requested to do so, it determines default values (step 604) by obtaining relevant measurements from one or more of the auxiliary vehicle tyre monitors and establishing the resulting value or values (step 605) as default monitoring values. While these may not be optimal values, they are also unlikely to be significantly wrong—by normal visual inspection of the auxiliary vehicle, a driver will generally have detected low type pressure in an auxiliary vehicle before hitching it to his vehicle, and the greater practical risk is in a rapid drop in tyre pressure during a journey as a result of a puncture. A further practical safeguard may be taken by the system requesting or suggesting that the driver check that the tyre pressure of the auxiliary vehicle tyres is correct or appropriate before using the received values as default monitoring values. For greater simplicity of use still, this check could take place for one nominated tyre, and the values from this nominated tyre used to establish tyre monitoring values for all the tyre monitors of the auxiliary vehicle. By accepting system-determined default values in this way, the driver can have good confidence in effective monitoring without inconvenience or risk in driver user entry. Default monitoring values can of course be updated using the learn and diagnostic mode of the controller at any future time.

As has been indicated above with respect to FIG. 5, the controller thus associates a set of auxiliary tyre monitor identities with a specific auxiliary vehicle. While this generally enables monitoring to be established with minimal driver input, it has the potential for inconvenience when one or more tyres are replaced on the auxiliary vehicle. This inconvenience may be avoided if the controller is allowed to determine a match if only some of the tyre monitors correspond to those stored for a specific auxiliary vehicle. The criteria for a match may be determined as appropriate—many criteria are possible, but examples are for two or more tyre monitors to be detected as identified in stored data to establish detection of an identified set, or for all but one of the tyre monitors identified with a set to be recognised for identification of a detected set to be established, or for a set to be identified as detected if either of these criteria apply.

Figure 7:
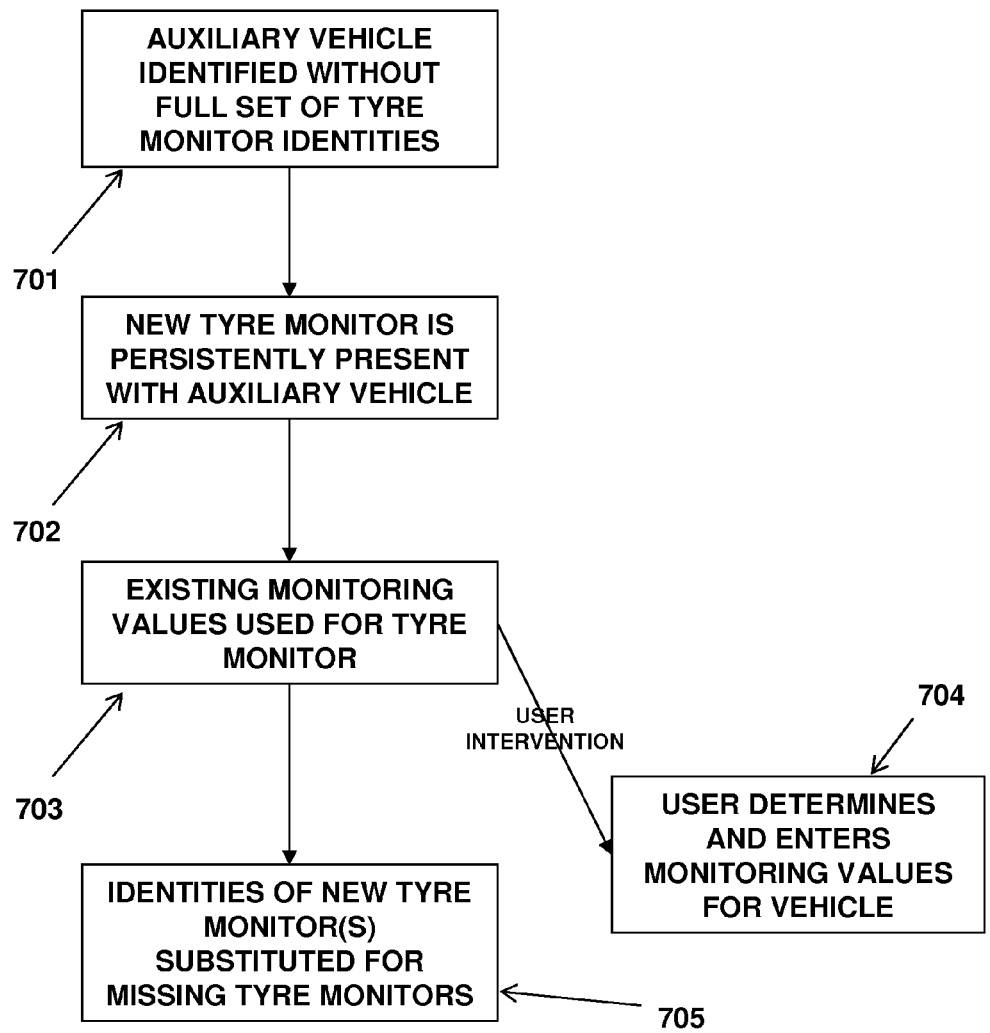
FIG. 7 is a flow diagram illustrating updating of tyre monitor sets in tyre monitoring according to an aspect of the invention.

If a set has been modified in this way, it is most likely because the tyre on an auxiliary vehicle wheel has been replaced. It can therefore be expected that this new tyre monitor will be replace the previous tyre monitor for future uses of the auxiliary vehicle. FIG. 7 is a flow diagram illustrating updating of tyre monitor sets in tyre monitoring according to a further aspect of the invention—step 505 of FIG. 5 indicates when this process may be invoked.

Step 505 of FIG. 5 corresponds broadly to step 701 of FIG. 7—it represents a determination that while the criteria for identifying an auxiliary vehicle from its tyre monitor identities have been met, the detected tyre monitor identities are not identical to the auxiliary tyre monitor identities stored by the controller for the identified auxiliary vehicle. This is not equivalent to a determination that a newly detected tyre monitor should be associated with the auxiliary vehicle. This determination is made in step 702. While the auxiliary vehicle may be identified directly by detection of a sufficient number of auxiliary tyre monitor identities, replacement is not the only possible reason why another tyre monitor identity may be detected. The undetected identity may belong to a tyre monitor which has ceased to function, or the tyre may have been replaced without a tyre monitor—the new detected identity may be a result of noise, for example from a vehicle passing nearby. The new identity will generally not be identified as a candidate for replacing a former value in the auxiliary vehicle set unless it has been detected for a predetermined period of time, or detected a predetermined number of times.

A default option is then established (step 703) of using the existing monitoring values for the identified auxiliary vehicle in monitoring the new tyre monitor or monitors. While this is the default option—and may be brought into effect directly if the driver takes no positive action—the driver should be provided with the option to enter a new value (by any of the means discussed with reference to FIG. 6 above—step 704) as there are situations where it will not be appropriate to use these existing monitoring values—one such situation being when an emergency tyre with different properties is being used as an emergency temporary replacement for a normal auxiliary vehicle tyre.

In step 705, the identities of the new tyre monitor or monitors are substituted for the identities of the tyre monitor or monitors no longer present in the set stored by the controller as being associated with that auxiliary vehicle. This may be done directly (possibly not coming to effect unless the driver indicates positively that this is not to be done within some period of time), or the driver may simply be offered the option of replacing the identities associated with that auxiliary vehicle. The driver is unlikely to disagree with this default approach in the case of a true replacement tyre, but do so for a temporary replacement tyre. The controller auxiliary vehicle information may thus be updated reliably with minimal intervention required from the vehicle driver.

Figure 8:
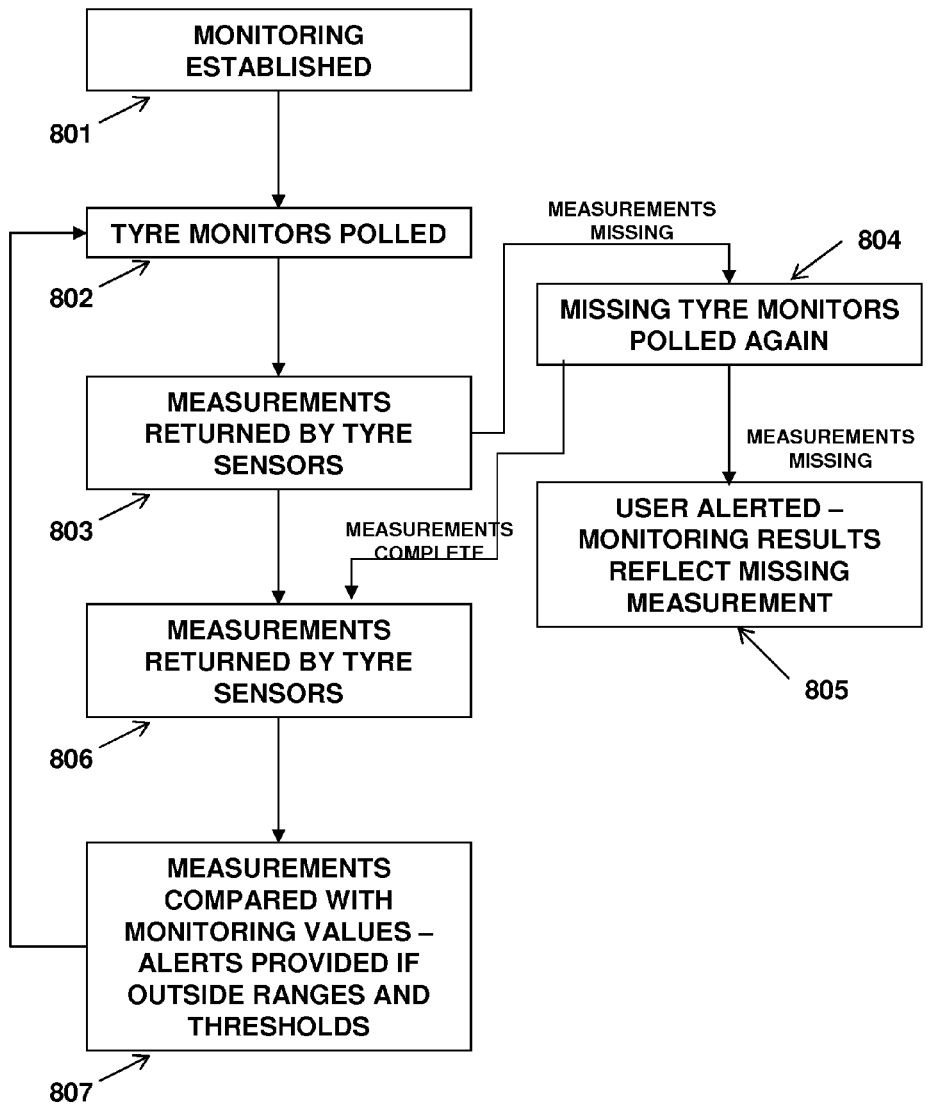
FIG. 8 is a flow diagram illustrating a general process of tyre monitoring suitable for use with aspects of the invention.

FIG. 8 is a flow diagram illustrating a general process of tyre monitoring suitable for use in aspects of the invention. Once monitoring has been established according to the processes set out in FIGS. 5 to 7 (step 801), the controller regularly polls (step 802) the tyre monitors of the vehicle and the auxiliary vehicle through the relevant transceivers 7, 27. The tyre monitors themselves continuously or continually update the values that they hold for each measurement, and the current measurement is returned (step 803) to the relevant transceiver and hence to the controller. If a signal is not received from a tyre monitor, it is polled again (step 804) for a predetermined length of time or number of times—if no signal is received over this period (step 805), an appropriate user alert is provided and the detected values from the other sensors are used as current values from those sensors. The controller then updates its values (step 806) for the relevant tyre monitor—if a tyre monitor state is currently being displayed on the human-machine interface, this will also be updated. The controller then determines (step 807) whether all values are the correct side of all safety thresholds and within all safe ranges—if not, the appropriate alert is provided to the user (typically a special visual signal or an audible warning). The controller then waits until the next polling time (for example, by waiting a predetermined time since the last polling event started) and restarts the monitoring loop (step 802).

Monitoring processes discussed above are focussed on tyre pressure monitoring, but as has been indicated above, in aspects of the invention monitoring of other auxiliary tyre variables is carried out. In particular, there are found to be a special benefit in monitoring tyre temperature together with tyre pressure. This benefit is that a high temperature may be indicative of a dangerous condition not necessarily determined by tyre pressure monitoring, or one that will not be detected by tyre pressure monitoring because of an error in data entry.

Figure 9:
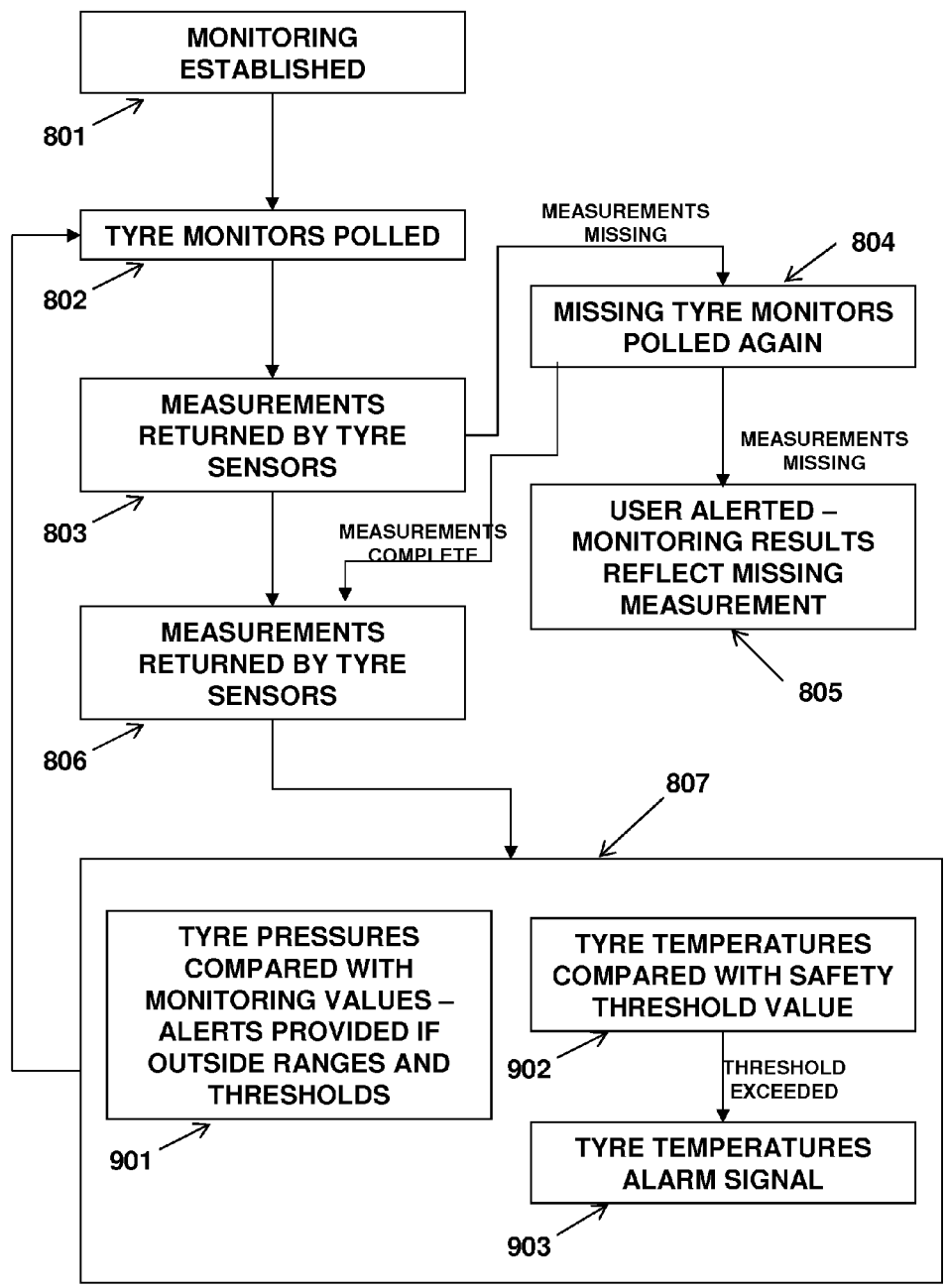
FIG. 9 is a flow diagram illustrating tyre temperature monitoring suitable for use in aspects of the present invention.

FIG. 9 is a flow diagram illustrating tyre temperature monitoring suitable for use with aspects of the present invention. FIG. 9 corresponds to FIG. 8 (the same reference numerals are used for equivalent steps), but indicates positively the detection of tyre temperature and pressure and the use of these values by the controller. Step 807 from FIG. 8 is broken out into tyre pressure monitoring (step 901) and tyre temperature monitoring (step 902). In step 902, if any detected tyre temperature is above a predetermined threshold temperature (this may be, for example, 65° C. for a conventional tyre), then an appropriate alarm signal is given (step 903). There are several possible reasons for a very high tyre temperature. One possible reason is underinflation of the tyre—while underinflation should also result in a low tyre pressure warning, it may not do so if the monitoring value for the tyre pressure has been misentered (for example, if a 90 psi tyre for a trailer is being monitored with a monitoring value of 30 psi appropriate to a main vehicle tyre). Overloading may also lead to a tyre pressure related alert, but it may not do so if this has resulted in wheel, rather than tyre, damage. A failed brake may also lead to high tyre temperature without anomalous pressure—again, this is a situation in which an alert is clearly needed for safety reasons.

Tyre temperature monitoring may be used for a main vehicle or an auxiliary vehicle (and the process described in FIG. 9 may apply to either). Tyre temperature monitoring is however particularly beneficial for auxiliary vehicles, as there is a risk present for auxiliary vehicles that will generally not be significant for main vehicles—this is that the pressure monitoring value for a monitored tyre has been misentered. This is most unlikely to happen for a main tyre, as correct tyre pressure values will generally be programmed into the vehicle's systems on manufacture. It is therefore desirable for the auxiliary vehicle tyre monitoring processes described in FIGS. 5 to 8 to be supplemented by an auxiliary vehicle tyre temperature monitoring process as described here.

In these different aspects, the present invention provides for effective monitoring of the tyres of an auxiliary vehicle in a manner which is safe, and which limits the need for driver involvement to situations where the driver wishes, or needs, to intervene.

The invention claimed is:

1. A method to establish tire monitoring of an auxiliary vehicle from a main vehicle, the method comprising:
   detection by the main vehicle of tire monitor identities of tire monitors of the auxiliary vehicle;
   determination by the main vehicle of whether the detected tire monitors are associated with an identified auxiliary vehicle, wherein the determination comprises determining whether the detected tire monitor identities correspond to tire monitor identities for an identified auxiliary vehicle that are stored in a memory of the main vehicle; and if the detected tire monitors are not associated with an identified auxiliary vehicle, setting monitoring values for tire monitoring corresponding to measured values of one or more of the auxiliary vehicle tire monitors.

2. A method as claimed in claim 1, wherein monitoring values are set corresponding to the value measured at a chosen one of the auxiliary vehicle tire monitors.

3. A method as claimed in claim 1, wherein the main vehicle determines from the measured value or values of the auxiliary vehicle tire monitors one or more thresholds or ranges to trigger warnings for tire monitor measurements.

4. A method as claimed in claim 1, wherein each of the tire monitors measures tire pressure.

5. A method as clamed in claim 4, wherein each of the tire monitors also measures tire temperature.

6. A method as claimed in claim 5, wherein the main vehicle provides a warning if the tire temperature measured by any of the tire monitors exceeds a predetermined value.

7. A method to establish tire monitoring of an auxiliary vehicle from a main vehicle, the method comprising:
    detection by the main vehicle of tire monitor identities of tire monitors of the auxiliary vehicle;
    determination by the main vehicle of whether the detected tire monitors are in a set of tire monitors associated with an identified auxiliary vehicle, wherein determination by the main vehicle of whether the detected tire monitors are in a set of tire monitors associated with an identified auxiliary vehicle does not require detection of all the tire monitor identities associated with an identified auxiliary vehicle, and further wherein the determination comprises determining whether the detected tire monitor identities correspond to tire monitor identities for an identified auxiliary vehicle that are stored in a memory of the main vehicle;
    wherein an identified auxiliary vehicle is identified when not all the tire monitor identities associated with an identified auxiliary vehicle are detected, and further comprising determination of whether a detected tire monitor identity associated with neither the main vehicle nor the auxiliary vehicle should replace the non-detected tire monitor identity in an association with the identified auxiliary vehicle; and
    wherein said determination of whether a detected tire monitor identity associated with neither the main vehicle nor the auxiliary vehicle should replace the non-detected tire monitor identity is made if the detected tire monitor identity is detected for longer than a predetermined time or for more than a predetermined number of times.

8. A method as claimed in claim 7, wherein each of the tire monitors measures tire pressure.

9. A method as claimed in claim 8, wherein each of the tire monitors also measures tire temperature.

10. A method as claimed in claim 9, wherein the main vehicle provides a warning if the tire temperature measured by any of the tire monitors exceeds a predetermined value.

11. A computer program stored in a memory, such that when a processor of a main vehicle is programmed by the computer program, the processor is adapted to perform the method of:
    detection by the main vehicle of tire monitor identities of tire monitors of the auxiliary vehicle;
    determination by the main vehicle of whether the detected tire monitors are in a set of tire monitors associated with an identified auxiliary vehicle, wherein determination by the main vehicle of whether the detected tire monitors are in a set of tire monitors associated with an identified auxiliary vehicle does not require detection of all the tire monitor identities associated with an identified auxiliary vehicle, and further wherein the determination comprises determining whether the detected tire monitor identities correspond to tire monitor identities for an identified auxiliary vehicle that are stored a memory of the main vehicle;
    wherein an identified auxiliary vehicle is identified when not all the tire monitor identities associated with an identified auxiliary vehicle are detected, and further comprising determination of whether a detected tire monitor identity associated with neither the main vehicle nor the auxiliary vehicle should replace the non-detected tire monitor identity in an association with the identified auxiliary vehicle; and
    wherein said determination of whether a detected tire monitor identity associated with neither the main vehicle nor the auxiliary vehicle should replace the non-detected tire monitor identity is made if the detected tire monitor identity is detected for longer than a predetermined time or for more than a predetermined number of times.

12. A monitoring system to enable tire monitoring of an auxiliary vehicle from a main vehicle, the monitoring system comprising:
    a controller having a processor and a memory;
    a transceiver to obtain information from tire monitors of the auxiliary vehicle; and
    a human-machine interface to provide tire monitoring values to a user and to receive user input;
    wherein the memory contains a computer program and wherein the processor is programmed to control the monitoring system to perform the method of:
    detection by the main vehicle of tire monitor identities of tire monitors of the auxiliary vehicle;
    determination by the main vehicle of whether the detected tire monitors are in a set of tire monitors associated with an identified auxiliary vehicle, wherein determination by the main vehicle of whether the detected tire monitors are in a set of tire monitors associated with an identified auxiliary vehicle does not require detection of all the tire monitor identities associated with an identified auxiliary vehicle, and further wherein the determination comprises determining whether the detected tire monitor identities correspond to tire monitor identities for an identified auxiliary vehicle that are stored in a memory of the main vehicle;
    wherein an identified auxiliary vehicle is identified when not all the tire monitor identities associated with an identified auxiliary vehicle are detected, and further comprising determination of whether a detected tire monitor identity associated with neither the main vehicle nor the auxiliary vehicle should replace the non-detected tire monitor identity in an association with the identified auxiliary vehicle; and
    wherein said determination of whether a detected tire monitor identity associated with neither the main vehicle nor the auxiliary vehicle should replace the non-detected tire monitor identity is made if the detected tire monitor identity is detected for longer than a predetermined time or for more than a predetermined number of times.

13. A computer program stored in a memory, such that when a processor of a main vehicle is programmed by the computer program, the processor is adapted to perform the method of:

detection by the main vehicle of tire monitor identities of tire monitors of the auxiliary vehicle;

determination by the main vehicle of whether the detected tire monitors are associated with an identified auxiliary vehicle, wherein the determination comprises the main vehicle determining whether the detected tire monitor identities correspond to tire monitor identities for an identified auxiliary vehicle that are stored in a memory of the main vehicle; and if the detected tire monitors are not associated with an identified auxiliary vehicle, setting monitoring values for tire monitoring corresponding to measured values of one or more of the auxiliary vehicle tire monitors.

14. A monitoring system to enable tire monitoring of an auxiliary vehicle from a main vehicle, the monitoring system comprising:

a controller having a processor and a memory;

a transceiver to obtain information from tire monitors of the auxiliary vehicle; and a human-machine interface to provide tire monitoring values to a user and to receive user input;

wherein the memory contains a computer program, and wherein the processor is programmed to control the monitoring system to perform the method of:

detection by the main vehicle of tire monitor identities of tire monitors of the auxiliary vehicle;

determination by the main vehicle of whether the detected tire monitors are associated with an identified auxiliary vehicle, wherein the determination comprises the main vehicle determining whether the detected tire monitor identities correspond to tire monitor identities for an identified auxiliary vehicle that are stored in a memory of the main vehicle; and if the detected tire monitors are not associated with an identified auxiliary vehicle, setting monitoring values for tire monitoring corresponding to measured values of one or more of the auxiliary vehicle tire monitors.

* * * * *